United States Patent [19]

Poppe et al.

[11] Patent Number: 4,863,991

[45] Date of Patent: Sep. 5, 1989

[54] FILLED COMPOSITION COMPRISING CRYSTALLINE COPOLYAMIDE FROM TEREPHTHALIC ACID, ISOPHTHALIC ACID AND HEXAMETHYLENE DIAMINE

[75] Inventors: Wassily Poppe, Lombard; Yu-Tsai Chen, Glenn Ellyn; Edward E. Paschke, Wheaton, all of Ill.

[73] Assignee: Amoco Corporation, Chicago, Ill.

[21] Appl. No.: 142,469

[22] Filed: Jan. 11, 1988

Related U.S. Application Data

[63] Continuation of Ser. No. 735,073, May 16, 1985, abandoned, which is a continuation-in-part of Ser. No. 601,863, Apr. 19, 1984, abandoned, which is a continuation-in-part of Ser. No. 466,901, Feb. 16, 1983, abandoned.

[51] Int. Cl.$^4$ ............................................. C08L 77/06
[52] U.S. Cl. ..................................... 524/606; 524/607; 528/338; 528/339; 528/340; 528/347; 528/349
[58] Field of Search ................ 524/606, 607; 528/339, 528/338, 340, 347, 349

[56] References Cited

U.S. PATENT DOCUMENTS

| | | | |
|---|---|---|---|
| 3,475,387 | 10/1969 | Carter et al. | 528/339 |
| 3,627,736 | 12/1971 | Raum et al. | 528/339 |
| 3,926,924 | 12/1975 | Edgar et al. | 528/323 |
| 3,941,755 | 3/1976 | Chapman et al. | 528/339 |
| 4,022,756 | 5/1977 | Chapman et al. | 528/339 |
| 4,113,708 | 9/1978 | Chapman et al. | 528/313 |
| 4,238,603 | 12/1980 | Chapman et al. | 528/339 |
| 4,607,073 | 8/1986 | Sakashita et al. | 524/606 |
| 4,742,110 | 5/1988 | Sakashita et al. | 524/606 |

*Primary Examiner*—Harold D. Anderson
*Attorney, Agent, or Firm*—Stephen L. Hensley; William H. Magidson; Ralph C. Medhurst

[57] ABSTRACT

Polyphthalamides which, when filled, have heat deflection temperatures of at least about 240° C. are prepared from compounds of terephthalic acid and isophthalic acid in a ratio of about 70:30 to about 99:1 in combination with a diamine which comprises hexamethylene diamine.

6 Claims, No Drawings

FILLED COMPOSITION COMPRISING CRYSTALLINE COPOLYAMIDE FROM TEREPHTHALIC ACID, ISOPHTHALIC ACID AND HEXAMETHYLENE DIAMINE

This is a continuation of application Ser. No. 735,073, filed May 16, 1985, now abandoned, which is a continuation-in-part of Ser. No. 601,863, filed Apr. 19, 1984, which is a continuation-in-part of Ser. No. 466,901, filed Feb. 16, 1983, now abandoned.

BACKGROUND OF THE INVENTION

1. Field of the Invention

The field of this invention relates to blends of crystalline copolyamides obtained from hexamethylene diamine (HMDA) and mixtures of compounds of terephthalic acid (TA) and isophthalic acid (IA) in combination with glass fiber, graphite fiber or mixtures thereof.

2. Background

Filled compositions of crystalline copolyamides from hexamethylene diamine and mixtures of compounds of terephthalic acid and isophthalic acid in which the TA content exceeds 70 mole percent of the acid moieties have not been disclosed in the prior art. In particular, blends in which these copolyamides are combined with glass fibers, graphite fibers or mixtures thereof and have heat deflection temperatures in excess of about 240° C. are unknown. In fact, U.S. Pat. No. 3,382,216 teaches that the preparation of polyhexamethylene terephthalamide cannot be effected through melt condensation processes.

U.S. Pat. No. 4,118,364 (1978) discloses polyamides of isophthalic acid and hexamethylene diamine filled with reinforcing materials such as glass fibers.

U.S. Pat. No. 3,941,755 (1976) discloses a copolyamide for fiber formation prepared with hexamethylene diamine which has a molar ratio of TA to IA of between about 60:40 and 80:20. However, this patent does not disclose the use of fillers. There is no suggestion that the compositions of the instant invention would have such unexpectedly high heat deflection temperatures. Other U.S. Pat. Nos. which similarly disclose a fiber forming copolyamide with a TA to IA ratio of up to 80:20 include 4,238,608 (1980); 4,113,708 (1978); and 4,022,756 (1977). None of these patents suggests the use of a filler. In fact, all of these patents teach that a high TA copolymer is not useful due to "phase-out" which can occur at TA levels greater than 60 mole percent (see column 2, lines 24–35 of U.S. Pat. No. 3,941,755). Additionally, there is no suggestion that a material with a heat deflection temperature greater than about 240° C. can be obtained by using certain fillers.

Other patents which might be of interest include U.S. Pat. No. 3,294,758, which discloses that compositions containing greater than 30 percent hexamethylene diamine are brittle. U.S. Pat. Nos. 3,825,516, 3,962,400, 3,941,755, 3,627,736, 3,692,749, and 3,382,216 disclose amorphous polyamides.

It is clear from a review of these references that the filled crystalline polyphthalamides manufactured from HMDA and mixtures of TA and IA wherein the TA content exceeds 70 percent of the total acid moieties, having heat deflection temperatures of about 240° C. to about 305° C., are unknown to the prior art. As used herein, a "crystalline" polymer is defined to be a polymer having a measurable, well-defined melting temperature.

STATEMENT OF THE INVENTION

The general object of this invention is to provide crystalline polyphthalamides and molding compositions or blends reinforced with glass fibers, graphite fibers or a mixture thereof. Another object is to provide a molding composition which has a heat deflection temperature of at least about 240° C.

We have now found that these objects can be accomplished by a resinous blend having a heat deflection temperature of at least 240° C., said blend comprising (1) about 10 to about 60 parts by weight of a filler selected from the group consisting of glass fibers, graphite fibers and mixtures thereof, and (2) about 90 to about 40 parts by weight of a polyamide resin of compounds of terephthalic acid (TA) and isophthalic acid (IA) in a molar ratio TA to IA of at least 81:19 to about 99:1 and a diamine which comprises hexamethylene diamine.

These objects can also be accomplished by a process for forming a resinous blend having a heat deflection temperature of at least 240° C., said process comprising (1) preparing a polyamide by combining dicarboxylic acid compounds and hexamethylene diamine, said dicarboxylic acid compounds comprising compounds of terephthalic acid and isophthalic acid in a molar ratio of at least 81:19 to about 99:1; (2) recovering said polyamide; and (3) mixing about 90 to about 40 parts by weight of said polyamide with about 10 to about 60 parts by weight of at least one of a filler selected from the group consisting of glass fibers, graphite fibers, and mixtures thereof.

We have found that crystalline polyphthalamides can be obtained from HMDA and a mixture of compounds of TA and IA. The mole ratio of TA and IA can vary from 81:19 to about 99:1, preferably about 70:30 to 85:15. This crystalline copolymer, when filled and molded with glass fibers, graphite fibers, or a mixture thereof, usually has a heat deflection temperature (HDT) in the range of at least about 240° C. to about 305° C. as determined by ASTM method, D648. This is an unusual feature and completely unexpected since polyphthalamides which have good fiber properties also have much lower heat deflection temperatures.

A high heat deflection temperature enables the injected molded polyphthalamides to be used in applications such as the hood of an automobile, shroud for a lawn mower, chain saw guard, and an electrical connector application. In addition to the high heat deflection temperature, the tensile strengths of these filled copolyamides are about 15,000 to about 40,000 psi which is as high or higher than that of die cast aluminum or zinc, while the specific gravity is about one-half that of aluminum or zinc. Thus, these blends of copolyamides and fillers are particularly useful for applications in transportation equipment. The molecular weight of one polyamide copolymer is about 5,000 to about 40,000.

The dicarboxylic acid compounds useful in preparing the polyamides of the instant invention are terephthalic acid (TA) and isophthalic acid (IA) and their derivatives which are capable of being reacted with diamines to form the instant polyamide. Useful derivatives include the corresponding acid halides, particularly terephthaloyl chloride and isophthaloyl chloride, and corresponding alkyl and aryl esters wherein preferably the alcohol component has at least two carbons, for example, ethyl terephthalate and phenyl terephthalate. The molar ratio of and TA and IA moieties can vary from 81:19 to about 99:1. Preferably, the molar ratio is about 85:15.

position of the instant invention. The data presented in Table 2 illustrate this point.

TABLE 2

| TA/IA-HMDA molar ratio | 65/35-100 | 72/28-100 | 75/25-100 | 85/15-100 | 85/15-100 | 100/0-100 |
|---|---|---|---|---|---|---|
| Glass fiber, % | 33 | 30 | 30 | 30 | 45 | 45 |
| Tensile strength, psi | 31100 | 29300 | 26900 | 18300 | 36600 | 8300 |
| Elongation at at break, % | 5 | 4 | 5 | 3 | 5 | 1 |
| HDT @ 264 psi, °F. | 270 | 560 | >560 | >560 | >580 | >580 |

The dicarboxylic acid compounds are combined with hexamethylene diamine to form the instant polyamide. However, small amounts of other diamines can be used in addition to the hexamethylene diamine.

The compositions of this invention are filled with about 10 to about 60 weight percent glass fibers, graphite fibers or a mixture thereof. Advantageously, the molding composition may contain from about 20 to about 50 weight percent of class fibers, graphite fibers or a mixture thereof. Other fillers such as glass beads and minerals such as talc can be used, however, these fillers may not provide a blend having as high a heat deflection temperature. These filled copolyamides are much more economical than molding compositions prepared without the use of the glass fibers, glass beads, minerals, or graphite fiber fillers.

It is well known from the prior art cited above that poly(hexamethylene phthalamide) with a high terephthalic acid content, i.e., greater than about 60 mole percent of the acid moieties, are difficult to prepare by melt polymerization unless extraordinary means are employed. (See for example U.S. Pat. No. 4,022,756 and U.S. Pat. No. 3,941,755). The teachings of the prior art relate to resins used as fiber forming compositions. The physical properties of two of the polyamide resins disclosed in the prior art are illustrated in Table 1 for injection molding compositions.

TABLE 1

| TA/IA-HMDA molar ratio | 65/35-100 | 68/32-100 | 72/28-100 |
|---|---|---|---|
| Tensile strength, psi | 15400 | 14900 | 7500 |
| Elongation at break, % | 5 | 14 | .2 |
| HDT @ 264 psi; °F. | 253 | 269 | 267 |

These results show that over the very narrow composition range of 68 mole percent TA to 72 mole percent TA the tensile strength declines by one half. The heat deflection temperature is unaffected. This catastrophic decline in the tensile strength is the direct result of the "phase out" phenomenon taught in U.S. Pat. No. 3,941,755 in which the TA-rich portions of the polymer crystallize. The 70/30-100 TA/IA-HMDA is the highest TA content composition taught by example in the prior art. It is apparent from the results presented in Table 1 that dramatic declines in the tensile strength and elongation would be expected for a molded article prepared from a TA/IA-HMDA resin with greater than 70 mole percent TA.

It is therefore quite surprising that this precipitous decline in tensile properties can be largely prevented by the incorporation of glass fibers or graphite fibers into crystalline, high terephthalic acid content poly(hexamethylene phthalamide) compositions. It is important to note that at the same time, the heat distortion temperature is increased dramatically, which substantially broadens the range of applications available to the com- The heat resistance of the glass fiber filled compositions shows a dramatic increase at the same composition for which the properties of the unfilled resin and the fiber are significantly lower. At a terephthalic acid level of 65 mole percent, the heat deflection temperature for the glass fiber filled composition is 270° F. In contrast, the heat deflection temperature is 560° F. for a filled composition in which the terephthalic acid level is 72 mole percent of the total acid content. However, when the terephthalic acid content is increased to 100 mole percent, i.e., no isophthalic acid present, the tensile strength is substantially decreased.

It is possible to add to the polyamides of this invention various additives such as heat stabilizers, UV stabilizers, other particulate and fibrous reinforcing agents, toughening agents, flame retardants, plasticizers, antioxidants, and pigments before, during or after the polymerization.

The following examples illustrate the preferred embodiment of this invention. It will be understood that the examples are for illustrative purposes only and do not purport to be wholly definitive with respect to the conditions or scope of the invention.

EXAMPLE 1

Prepolymer Preparation 85/15-100 (TA/IA-HMDA)

The reaction mixture of 4517 grams (g) TA, 797 g IA, 5431 g HMDA (containing 29.5 percent water as received from Monsanto), 1135 g distilled water and 8 g sodium hypophosphite was placed in the Atlantic Research 10CV Helicone reactor that had been preheated to between 80° and 95° C. The reactor agitator was set at 28 rpm turning upward. Then the temperature of the reactor was properly controlled to rise by the heating system. After about 50 minutes, the heating system was set at 220° C. Pressure was controlled to be below 120 psi. The agitator was changed to turning downward. Then temperature was further increased. After about 115 minutes from the beginning of the process, the melt temperature reached 260° C. The agitator rpm was set to about 10. After about 120 minutes from the beginning, the reactor pressure was vented to atmospheric pressure in about 5 minutes. Then the prepolymer was dumped out of the reactor. The total reaction time for this batch was about 125 minutes. The prepolymer had I.V. in the range of 0.2 to 0.3 dl/g. (I.V. measured in a 60/40 solution of phenol/tetrachloroethane at 30° C.)

Polymer Preparation From Prepolymer in ZSK-30 Twin-Screw Extruder/Reactor

The polyamide must be finished to an inherent viscosity of about 0.8 dl/g or greater in order to fully realize the improved properties of the instant polyamides. This finishing process is the final polycondensation step and utilizes a Werner-Pfleiderer ZSK-30 twin-screw extruder reactor. The twin-screw extruder allows these stiff, high melting resins to be easily handled. The screw configuration employed when the twin-screw extruder is used as a polycondensation reactor consists of four basic sections. The first section is a feed section which is composed of relatively long pitches for conveying the polymerization mixture away from the feeding port. The second section is a short compression section which compresses the polymerization mixture and provides a melt seal for the reaction zone. The reaction zone comprised about 70-80 percent of the entire length of the extruder. Typically, the screw flights have relatively long pitches, but various mixing elements or kneading blocks can be included in this section. The final section is also a compression section which feeds the die. Other types of finishing reactors such as disk ring reactors, agitated stranding devolatilizers, and thin film evaporators can be utilized; however, some of these can have difficulty in handling the high viscosity of our resins.

The extruder/reactor controllers were set as in the following:

| EXTRUDER/REACTOR BARREL TEMPERATURE SETTINGS, °C. | | | | | | |
|---|---|---|---|---|---|---|
| Zone 1 | Zone 2 | Zone 3 | Zone 4 | Zone 5 | Zone 6 | RPM |
| 95 | 295 | 370 | 360 | 320 | 320 | 100 |

To minimize the color change, nitrogen purge was used to vent. The prepolymer was fed into extruder/reactor after the operating condition was lined up. The polymer melt temperature Zone 6 was measured to be about 330° C. The screw torque was 50 percent and the output rate was 3 lb/hr for this run. The resin I.V. of this run was 0.90 dl/g.

Properties

The polymer of 0.90 I.V. was dried, ground, mixed with 45 percent glass fibers (PPG 3540), with and without Irganox 1098, a stabilizer, and then injection molded into test bars. The test results based on ASTM standard testing methods are shown in the following table:

| PROPERTIES OF 85/15-100 (TA/IA-HMDA) COPOLYAMIDE | | | |
|---|---|---|---|
| GLASS FIBERS % | IRGANOX 1098 % | TENSILE STRENGTH ASTM METHOD D638 PSI | TENSILE ELONGATION ASTM METHOD D638 % |
| 45 | 0 | 36,000 | 4.1 |
| 45 | 1 | 37,000 | 4.3 |
| | FLEXURAL STRENGTH ASTM METHOD D790 PSI | FLEXURAL MODULUS ASTM METHOD D790 MM PSI | HDT (@ 264 PSI) ASTM METHOD D648 °C. (°F.) |
| | 48,400 | 1.91 | >304 (579) |
| | 48,900 | 2.03 | >304 (579) |

EXAMPLE 2

Attempted Melt Preparation of Poly(hexamethylene terephthalamide)

Three different methods were used in an attempt to prepare a 100-100 (TA-HMDA) polyamide. One method was the melt process, except that more water was added in the beginning of the reaction. The second method consisted of a two-stage reaction. In the first stage, a prepolymer from 80 moles TA and 100 moles HMDA was prepared in a 4CV Atlantic Research reactor. During the second stage of IV appreciation in the ZSK-30, the remaining 20 moles of TA were added. The third method was again the melt process with 2 weight % of heat stabilizer and antioxidant Irganox 1098 added to the monomers before the start of the reaction. After the preparation of the prepolymers in the 4CV reactor was concluded, they were extruded on the ZSK-30. The details of all three methods are given in Table 3. There were considerable losses for the first two methods because of charring, also the IV appreciation was poor. We combined method one and two and extruded it again on the ZSK-30. The resulting resin had poor color and still seemed to have a low IV. The resin was then mixed with glass fibers and injection molded. The resulting specimen had a 45% glass fiber content. The runs of method three did not char as badly but had also a low IV appreciation if any during the extrusion on the ZSK-30.

The properties obtained for 45% glass filled resins are presented in Table 4.

TABLE 3

| Methods Tried to Prepare 100-100 (TA-HMDA) Polyamide Via the Melt Process | | |
|---|---|---|
| | Sample A* | |
| Formulation | 1st Method 100 TA + 100 HMDA +Extra Water | 2nd Method 100 TA + 80 HMDA | Sample B 3rd Method 100 TA + 100 HMDA +2 Weight % Irganox 1098 |
| Number of Runs | 4 | 3 | 3 |
| Reactor Temperature, °F. | 470 | 490 | 490 |
| Prepolymer Solubility in Phenol/TCE | Not Soluble | Soluble | Not Soluble |
| Consistency in the 4CV Reactor at Discharge | Solid | Liquid | Solid |
| Addition to the Formulation in ZSK-30 | None | 20 TA | None |
| ZSK-30 Barrel Temperature °F. | 650 | 650 | 650 |
| Polymer Solubility in Phenol/TCE | Not Soluble | Not Soluble | Not Soluble |
| Molding on the Arburg | | | |
| Rear Zone, °F. | | 610 | 625 |
| Front Zone, °F. | | 645 | 660 |
| Nozzle, °F. | | <650 | <650 |
| Mold, °F. | | 425 | 425 |
| Addition Made During Molding | | 45% Glass 1% PTFE | 45% Glass 1% PTFE |

*Note: The 4 runs of method 1 and three runs of method 2 were combined after their extrusion on ZSK-30 and extruded again on the ZSK-30.

TABLE 4
Material Properties of 45% Glass Fiber Filled Polyhexamethylene Terephthalamide

| Sample | Resin I.V. dl/g | Tensile Strength M psi | Elongation % | Flexural Strength M psi | Flexural Modulus MM psi |
|---|---|---|---|---|---|
| A | — | 8.27 | 1.2 | 15.7 | 1.60 |
| B | 0.2* | 7.61 | 1.2 | 14.7 | 1.53 |

| Sample | Notched Izod ft-lb/in | Tensile Impact ft-lb/in2 | HDT (@ 264 psi) °F. | Water Absorption % |
|---|---|---|---|---|
| A | 1.2 | 13.4 | >580 | 3.14 |
| B | — | 15.7 | — | 2.13 |

*Sulfuric acid was the solvent used for this I.V. determination.

EXAMPLE 3

Continuous Preparation of 65/35-100 (TA/IA-HMDA) Copolymer

The following charge was placed in the salt reactor:

| Component | Amount, g |
|---|---|
| TA | 6447.1 |
| IA | 3471.5 |
| BA (benzoic acid) | 73.3 |
| HMDA | 7112.1 |
| $H_2O$ | 3110 |
| $NaH_2PO_2 \cdot H_2O$ | 13.8 |

The salt reactor consisted of a 5-gallon stirred tank reactor with internal coils, an oil jacket for temperature control, and a pitched-blade turbine with a variable speed drive.

After the salt reactor was charged, it was purged with nitrogen and heated to 420° F. (216° C.). The pressure was set to 480 psig by first allowing the water in the salt to reach its equilibrium pressure and then adjusting with nitrogen. In the feed batch operations, the salt was subjected to a range of residence times. They averaged about 100 minutes. Also, as a result of the feed batch mode of operation, it was necessary to include a second surge vessel in the salt preparation section. This vessel, which was at 420° F. (216° C.) and 450 psig, was used to isolate the salt reactor during charge addition.

Upon leaving the salt section, the salt was passed through a 140 micron filter into a two-headed positive displacement Bran-Lubbe pump. Temperature through the pump was maintained at 406° F. (209° C.). Pressures were increased to 1800 psig in the pump. After passing through the pump, the salt solution was passed through a preheat zone and heated to 622° F. (328° C.). The pressure prevented vapor formation in the preheater. Residence time in the preheater was 40 seconds.

The salt entered the flash reactor through a valve manufactured by Research Control Valve (RCV) where pressure was reduced from about 1800 psig to about 0 to 400 psig. The flash reactor was a tubular reactor about 10 to 14 feet long with an internal diameter of 0.375 to 0.5 inches. The wall temperature of this reactor was maintained at about 700° to 750° F. The necessary heat was supplied by hot oil jacket, electrical heaters, or other means. The internal temperature of this reactor was monitored along its length. The temperature of the reaction mixture was between about 525° F. and 630° F. within the reactor. The pressure within the flash reactor was controlled by a second RCV. The residence time in the flash reactor was about 10 seconds.

The process conditions were:

| Process Conditions | | |
|---|---|---|
| Preheat Reactor | | |
| Temp. °F. | Press. Psig | Rate Gal/Hr. |
| 640 | 1850 | 1.8 |

| Pressure, psig | Reactor Temperature, °F. | | | |
|---|---|---|---|---|
| | 1/4 | 1/2 | 3/4 | Final |
| 50 | 541 | 556 | 576 | 592 |

Upon exiting the flash reactor, the reaction mixture is injected directly onto the screws of a twin-screw extruder/reactor, the Werner-Pfleiderer ZSK-30, described above. The twin-screw extruder increases the molecular weight of the polymer, to provide an inherent viscosity of the finished polymer of about 0.8 dl/g or greater. The process conditions employed in the twin-screw reactor are presented below.

| ZSK-30 Conditions | | | | | | |
|---|---|---|---|---|---|---|
| Screw Speed Rpm | Torque Percent | Zone Temperature, °F. | | | | |
| | | 1 | 2 | 3 | 4 | 5 |
| 125 | 28 | 620 | 620 | 620 | 565 | 550 |

| Temperature, °F. Final | | Product Rate |
|---|---|---|
| Die | Melt | lb./hr. |
| 550 | 556 | 9.0 |

The resin produced above had an inherent viscosity of 0.81 dl/g. This resin was compounded with 33 weight percent glass fiber by first dry blending the ingredients and then melt compounding the resins on the ZSK-30 twin-screw/extruder reactor. The processing conditions employed were:

| Compounding Conditions, ZSK-30 | | | | | | |
|---|---|---|---|---|---|---|
| Screw Speed | Torque | Zone Temperature, °F. | | | | |
| | | 1 | 2 | 3 | 4 | 5 |
| 90 | 41 | 535 | 600 | 600 | 600 | 600 |

| Die Temp °F. | Product Rate lb./hr. |
|---|---|
| 600 | 17 |

The filled and neat resins were injection molded. The following material properties were obtained.

| Glass Fiber % | Ultimate Tensile Strength psi | Elongation at Break % | Flexural Strength psi | Flexural Modulus psi | Notched Izod Ft-lb/in | HDT @ 264 psi, °F. |
|---|---|---|---|---|---|---|
| 0 | 15400 | 5.0 | 22800 | 444000 | 0.8 | 241 |

| Glass Fiber % | Ultimate Tensile Strength psi | Elongation at Break % | Flexural Strength psi | Modulus psi | Notched Izod Ft-lb/in | HDT @ 264 psi, °F. |
|---|---|---|---|---|---|---|
| 33 | 31100 | 4.5 | 42300 | 1360000 | 1.9 | 270 |

EXAMPLE 4

Preparation of 68/32-100 (TA/IA-HMDA)

This polymer was prepared by the process described in Example 1 except that the charge to the reactor consisted of the following ingredients:

| Component | Amount, g |
|---|---|
| TA | 5084 |
| IA | 2392 |
| HMDA | 6329 |
| H₂O | 2272 |
| NaH₂PO₂ · H₂O | 12 |
| Silicone Oil DC-200 | 12 |

The resin had the following material properties:

| Tensile Properties | | | | Flexural | | Notched | |
|---|---|---|---|---|---|---|---|
| Yield Strength psi | Elongation % | Ultimate Strength psi | Elongation at Break % | Strength psi | Modulus psi | Izod ft-lb/in. | HDT @ 264 psi; °F. |
| 17400 | 7.9 | 14900 | 14 | 24600 | 45900 | 1.8 | 269 |

EXAMPLE 5

Preparation of 72/28-100 (TA/IA-HMDA)

The polyamide of 72/28-100 (TA/IA-HMDA) composition was produced by the batch melt process on the 4CV Helicone reactor. The rectants, 358.84 g TA, 139.55 g IA, 479.9 g HMDA including 25.9% water as received, 89 g deionized water, and 0.5 g sodium hypophosphite as catalyst, were loaded into the 4CV Helicone reactor, which was preheated to 190°–210° F. The temperature controller was set at 600° F. The agitator was set about 10 rpm. After about 26 minutes, the pressure in the reactor rose to about 120 psi. The pressure was held at 120 psi for about 15 minutes as the melt temperature rose to about 506° F. Then the pressure was vented down to 100 psi in 3 minutes and was held at 110 psi for about 10 minutes. At this point, the temperature controller was set at 610° F. The pressure was held at 100 psi for an additional 7 minutes and then was vented down to atmospheric pressure in about 2 minutes. At this time, the melt temperature rose to about 609° F. and the current for agitator started to increase. The polymer was then dumped into water.

The inherent viscosity of the polymer measured in the solvent of 60/40 phenol/tetrachloroethane mixture at 30° C. was 0.91 dl/g.

The polyamide resin produced by the batch melt process was ground and dried at 230° F. under vacuum overnight. One part was kept as neat resin. The other part was dry blended with 30% PPG 3540 glass fibers. The samples were injection molded into test bars on the Arburg molding machine by using a mold temperature of 250° F. and barrel temperature profile of 580, 610, 610° F. Type I tensile bars were molded and tested at 2"/min testing speed. The test results are shown in the following table.

| Glass Fiber % | Ultimate Strength psi | Elongation at Break % | Flexural Strength psi | Modulus psi | Notched Izod ft-lb/in. | HDT @ 264 psi, °F. |
|---|---|---|---|---|---|---|
| 0 | 7500 | 2 | 20400 | 52100 | 1.1 | 267 |
| 30 | 29300 | 4 | 43900 | 1370000 | 2.7 | >560 |

EXAMPLE 6

75/25-100 (TA/IA-HMDA) Polyamide

In this example a salt reactor, a standpipe, and a polycondensation reactor in series were employed to obtain a polycondensate with an inherent viscosity of about 0.1 to 0.2 dl/g. This polycondensate of low inherent viscosity was termed a prepolymer. The high melt viscosity and high melt temperature of these polymers limited the inherent viscosity which could be obtained in the series of reactors. This low inherent vicosity material was then finished to a polymer of 0.85 dl/g inherent viscosity in the ZSK-30 extruder/reactor.

In this semi-continuous process, the reactants, 4984 g TA, 1661.2 g IA, 6540.8 g HMDA including 26.8% water as received, 800 g deionized water, 9.16 g NaH₂PO₂.H₂O and 9.16 g silicone oil, were changed to a 5-gallon salt reactor. The salt reactor was operated at 445 psig and 445° F. (melt temperature). The effluent from this reactor was then passed to a standpipe which was operated at 420 psig and 470° F. (heating oil temperature). The effluent from this standpipe was then let down into a polycondensation reactor operated at 375 psig and 470° F. (melt temperature). The residence time in the polycondensation reactor was about 30 minutes. At the end of this time, the reactor was vented down to atmosphere pressure and the prepolymer was removed from the reactor.

The prepolymer was dried in a forced air oven at 80° C. overnight and then ground to about a 3 mm size. The inherent viscosity was determined to be 0.11 dl/g indicating the prepolymer was good enough for the feed of ZSK-30 extruder/reactor. The dried prepolymer was led to the ZSK-30 twin-screw extruder/reactor. The extruder/reactor was operated at atmospheric pressure. The operating conditions are shown in the attached table. The residence time in the extruder was about 2 minutes. The inherent viscosity of the product was 0.85 dl/g.

| ZSK-30 Conditions | | | | | |
| --- | --- | --- | --- | --- | --- |
| Screw Speed | Torque | Zone Temperature, °F. | | | |
| Rpm | Percent | 1 | 2 | 3 | 4 | 5 |
| 75 | 45–55 | 510 | 700 | 708 | 615 | 610 |
| Temperature, °F. Final | | Product Rate | | | |
| Die | Melt | lb./hr. | | IV | |
| 610 | 620 | 8 | | 0.85 | |

We claim:

1. A resinous blend having a heat deflection temperature of at least 240° C., said blend comprising (1) about 10 to about 60 parts by weight of a filler selected from the group consisting of glass fibers, graphite fibers and mixtures thereof, and (2) about 90 to about 40 parts by weight of a polyamide resin of compounds of terephthalic acid (TA) and isophthalic acid (IA) in a molar ratio TA to IA of at least 81:19 to about 99:1 and hexamethylene diamine.

2. The blend of claim 1 comprising 20 to 50 parts by weight of said filler and 80 to 50 parts by weight of said polyamide resin.

3. The blend of claim 1 wherein said compounds of terephthalic acid and isophthalic acid are terephthalic acid and isophthalic acid.

4. The blend of claim 1 wherein said ratio of terephthalic acid compound to isophthalic acid compound is 85:15.

5. A molded article comprising the blend of claim 2.

6. A molded article having a heat deflection temperature of at least 240° C., said article formed from a blend comprising (1) about 10 to about 60 parts by weight of at least one filler selected from the group consisting of glass fibers and graphite fibers and (2) about 90 to about 40 parts by weight of a polyamide resin of terephthalic acid and isophthalic acid compounds in a molar ratio of at least 81:19 to about 99:1 and hexamethylene diamine.

* * * * *